United States Patent
Geus et al.

(10) Patent No.: US 11,992,991 B2
(45) Date of Patent: May 28, 2024

(54) NOZZLE FOR MAKING MELTBLOWN FILAMENTS

(71) Applicants: Hans-Georg Geus, Niederkassel (DE); Raphael Hermes, Niederkassel (DE); Markus Jansen, Monheim am Rhein (DE); Norbert Terlau, Bergisch Gladbach (DE); Markus Wuescht, Rheinbach (DE)

(72) Inventors: Hans-Georg Geus, Niederkassel (DE); Raphael Hermes, Niederkassel (DE); Markus Jansen, Monheim am Rhein (DE); Norbert Terlau, Bergisch Gladbach (DE); Markus Wuescht, Rheinbach (DE)

(73) Assignee: REIFENHAEUSER GMBH & CO. KG MASCHINENFABRIK, Troisdorf (DE)

( * ) Notice: Subject to any disclaimer, the term of this patent is extended or adjusted under 35 U.S.C. 154(b) by 0 days.

(21) Appl. No.: 17/867,340

(22) Filed: Jul. 18, 2022

(65) Prior Publication Data

US 2023/0021972 A1    Jan. 26, 2023

(51) Int. Cl.
*B29C 48/345* (2019.01)
*B29C 48/05* (2019.01)
(Continued)

(52) U.S. Cl.
CPC ............ *B29C 48/345* (2019.02); *B29C 48/05* (2019.02); *D01D 4/025* (2013.01); *D01D 5/0985* (2013.01);
(Continued)

(58) Field of Classification Search
CPC ...... B29C 48/05; B29C 48/345; D01D 4/025; D01D 5/0985; D04H 1/565; D04H 3/16; D04H 5/08
See application file for complete search history.

(56) References Cited

U.S. PATENT DOCUMENTS 6,051,180 A  *  4/2000  Kwok ................... D01D 4/025
                                                    264/210.8
6,053,719 A  *  4/2000  Barbier ................. D04H 3/011
                                                    425/81.1
(Continued)

FOREIGN PATENT DOCUMENTS

CN          111534866 A     8/2020

*Primary Examiner* — Xiao S Zhao
*Assistant Examiner* — Joseph S Leyson
(74) *Attorney, Agent, or Firm* — Andrew Wilford (57) ABSTRACT

A nozzle has a body having a face extending in a longitudinal direction and transversely thereto in a transverse direction. The nozzle plate is provided with an array of melt openings and compressed-air openings on the face in a plurality of longitudinally extending rows and a plurality of transversely extending rows. A polymer melt to the nozzle openings to extrude the polymer melt downstream from the melt openings as polymer filaments and compressed air to the compressed-air openings to form air jets issuing downstream from the compressed-air openings between the polymer filaments. Only the polymer melt and no air is supplied to the melt openings such that only the polymer melt issues from the melt openings. Only compressed air and no polymer melt is supplied to the compressed-air openings such that only the compressed air issues from the compressed-air openings.

15 Claims, 3 Drawing Sheets

(51) Int. Cl.
*D01D 4/02* (2006.01)
*D01D 5/098* (2006.01)
*D04H 1/56* (2006.01)
*B29L 31/00* (2006.01)

(52) U.S. Cl.
CPC ........ *D04H 1/565* (2013.01); *B29L 2031/726* (2013.01)

(56) References Cited

U.S. PATENT DOCUMENTS

| | | | |
|---|---|---|---|
| 7,008,207 B2 | 3/2006 | Bansal | |
| 10,682,291 B2 | 5/2020 | Castillo | |
| 2004/0201127 A1* | 10/2004 | James | D01F 6/14 425/114 |
| 2016/0355950 A1* | 12/2016 | Young | D04H 1/565 |

* cited by examiner

NOZZLE FOR MAKING MELTBLOWN FILAMENTS

FIELD OF THE INVENTION

The present invention relates to the manufacture of thermoplastic filaments. More particularly this invention concerns a method and apparatus for making filaments for forming a nonwoven.

BACKGROUND OF THE INVENTION

Such a nozzle is configured as a melt-blowing blow head and comprises a body or plate provided with plurality of nozzle openings. When making filaments using a melt-blowing blow head, the polymer melts emerging from nozzle openings or melt openings are usually subjected to a temperature-controlled compressed air stream. The polymer melts or the molten plastic filaments are, as it were, extruded in a rapid compressed air stream.

Nozzles or melt-blowing blow heads of the type mentioned initially are fundamentally known from practice in various embodiments. In conventional melt-blowing methods the curtain of the extruded plastic filaments is subjected from the side or from opposite sides to a two-dimensional compressed air stream or to two-dimensional compressed air streams. The corresponding nozzles comprising a plurality of melt openings extending in a single row and two air inflow gaps running parallel thereto and inclined in the direction of the row of melt openings are also designated as single-row nozzles. These single-row nozzles have proved fundamentally successful. However, they are not usually suitable for high polymer throughput. Furthermore, multi-row nozzles are known in which a plurality of rows of melt openings are provided. In one configuration of these multi-row nozzles each individual melt opening or each individual extruded plastic filament is subjected to a separate compressed air stream from a compressed-air opening extending coaxially to the melt opening and thus assigned directly to the melt opening so that each individual filament is subjected to a compressed air stream surrounding the filament in casing form. These nozzles are also known as Biax nozzles from the Biax Fiberfilm Corporation, USA and have proved fundamentally successful. Multirow nozzles or Biax nozzles are primarily provided for large polymer output.

However, it has been shown that the known nozzles or melt-blowing blow heads are not optimally suitable for all melt-blowing methods. Usually a filament-air stream comprising the filaments produced and the compressed air flows from the nozzles in the direction of a deposition belt extending underneath the nozzle. With the known nozzles or melt-blowing blow heads it is usually not possible to specifically influence the emerging filament-air stream with regard to its condition and in particular its geometry. This applies in particular to individual regions of the filament-air stream, possibly to the edge regions. The nozzles or melt-blowing blow heads known from practice usually only allow any influence of the filament-air stream via the influencing variables polymer throughput, compressed air throughput and inflow angle of the compressed air in relation to the filaments. As a result, perturbing influences experienced by the filament-air stream on the flow path from the nozzle to the deposition belt cannot be sufficiently counteracted. For example, irregularities such as turbulence can occur in edge regions of the filament-air stream. Furthermore, in an arrangement of the nozzle or melt-blowing blow head that is oblique or angled in relation to the deposition belt, gravitational effects can occur that can influence the flow of the filament-air stream and can also result in turbulence.

Furthermore, in some melt-blowing methods it is known to combine a plurality of filament-air streams and/or short fiber or particle streams between the corresponding nozzles and the deposition belt and deposit them as a filament mixture or filament-short-fiber mixture. When combining the streams, turbulence should be avoided as far as possible. To this end, a specific influencing of the condition or the geometry of the filament-air streams is required. It has been shown that with the known nozzles or melt-blowing blow heads, such specific influencing of the condition or the geometry of the filament-air streams are not possible or not to a sufficient extent. Perturbing influences or perturbing factors in relation to the filament-air streams then cannot be specifically avoided or corrected.

OBJECTS OF THE INVENTION

It is therefore an object of the present invention to provide an improved method and apparatus for making a nonwoven from melt-blown filaments.

Another object is the provision of such an improved method and apparatus for making a nonwoven from melt-blown filaments that overcomes the above-given disadvantages, in particular that allows a specific influencing of the filament-air stream produced in order to counteract perturbing influences, for example, turbulence on the flow path and that nevertheless enables a high polymer throughput.

SUMMARY OF THE INVENTION

According to the invention the nozzle has a nozzle plate or body having a face extending in a longitudinal direction and transversely thereto in a transverse direction. The nozzle is provided with an array of melt openings and compressed-air openings on the face in a plurality of longitudinally extending rows and a plurality of transversely extending rows, and means for supplying a polymer melt to the nozzle openings to extrude the polymer melt downstream from the melt openings as polymer filaments and for supplying compressed air to the compressed-air openings to form air jets issuing downstream from the compressed-air openings between the polymer filaments. Only the polymer melt and no air is supplied to the melt openings such that only the polymer melt issues from the melt openings. According to another feature of the invention only compressed air and no polymer melt is supplied to the compressed-air openings such that only the compressed air issues from the compressed-air openings.

In other words, this invention teaches a nozzle for making filaments, in particular from a polymer melt of thermoplastic material, and the nozzle is configured as a melt-blowing blow head and comprises a plurality of nozzle openings, extending preferably in at least two, more preferably in at least three, particularly preferably in at least four rows or longitudinal rows. Some of the nozzle openings is configured as melt-only openings and others or the remainder of the nozzle openings are configured as compressed-air-only openings, and the melt openings and the compressed-air openings are spaced apart from one another in a regular pattern and/or irregularly.

In particular continuous filaments or melt-blowing continuous filaments can be produced with the nozzle according to the invention. The continuous filaments or melt-blowing continuous filaments preferably have an average filament diameter in the range of 0.1 to 15 µm, preferably between 0.5 and 10 μm. Continuous filaments differ as a result of their quasi-endless length from short fibers that have significantly shorter lengths of, for example, 10 mm to 60 mm. The filaments produced or continuous filaments are preferably formed on the basis of at least one thermoplastic material, more preferably selected from the group "polypropylene, polyethylene, polyester, in particular polyethylene terephthalate, polylactide, polyvinyl alcohol." According to an alternative embodiment, the filaments produced are formed on the basis of Lyocell or a Lyocell solution. It is particularly preferred within the scope of the invention that the filaments or continuous filaments produced are produced from a polymer melt of thermoplastic material, and the thermoplastic material is particularly preferably polypropylene and/or polyethylene, quite particularly preferably polypropylene.

It is also preferred that the nozzle openings of the nozzle according to the invention are arrayed in or on a nozzle plate. Preferably the nozzle openings are arrayed in at least two, more preferably in at least three, particularly preferably in at least four rows or longitudinal rows on the nozzle or the nozzle plate. Further preferably the nozzle openings are arrayed in at least five, quite particularly preferably in at least six, for example, in at least seven rows or longitudinal rows on the nozzle or the nozzle plate. It is possible that the nozzle openings are arrayed in at least eight, in particular in at least ten, preferably in at least twelve, more preferably in at least fourteen rows or longitudinal rows on the nozzle or the nozzle plate. The term row or longitudinal row means within the scope of the invention a row of nozzle openings that extend in the longitudinal direction of the nozzle and in this respect have a greater extension and/or larger number of nozzle openings than transverse rows of the nozzle extending transversely, in particular perpendicular or substantially perpendicular to the longitudinal rows, which result from several longitudinal rows extending next to one another. In a melt-blowing system in which the nozzle is above a deposition belt, the longitudinal rows of the nozzle preferably extend transversely, in particular perpendicular or substantially perpendicular to the machine direction or to the conveying direction of the deposition belt.

According to the invention, the melt openings and the compressed-air openings are spaced apart from one another in a regular pattern and/or irregularly. Regular pattern means in this case in particular a uniform, repeating sequence of the distribution of the melt openings and the compressed-air openings in the sense of a repetition unit. Irregular arrangement means in particular here a non-uniform or random distribution of the melt openings and the compressed-air openings without such a repeating repetition unit. It is also possible within the scope of the invention that in regions or sections of the nozzle there is a regular pattern and in other regions or sections of the nozzle there is an irregular arrangement of melt openings and compressed-air openings.

A particularly preferred embodiment of the invention is characterized in that the melt openings are configured in such a manner that only the polymer melt exits therefrom. The melt openings are expediently supplied with the polymer melt. Particularly preferably the melt openings are configured in such a manner that the polymer melt exits therefrom without a compressed air stream exiting coaxially to the respective melt opening. The nozzle openings configured as melt openings are, according to this preferred embodiment, only provided for the exit of the polymer melt, so that no compressed air exits from the melt opening together with the polymer melt. The filaments emerging from the melt openings are, within the scope of the invention, preferably only subjected to compressed air that emerges from the compressed-air openings at a spacing from the melt openings. The polymer melt is therefore preferably, as it were, extruded in an air stream having a cross-sectional area that corresponds to the two-dimensional extension of the nozzle or that is determined by the arrangement of the compressed-air openings.

The compressed-air openings are preferably each assigned not just one single melt opening. Thus, the filaments emerging from the melt openings are also not subjected to compressed air from a compressed-air opening extending coaxially to the respective melt openings. This embodiment is based on the discovery that due to the separation or decoupling of melt openings and compressed-air openings and the spaced-apart arrangement thereof in a regular pattern and/or the irregular spaced-apart arrangement thereof on the nozzle, a functionally reliable control or influencing of the resulting filament-air flow is possible.

It is further preferred that the compressed-air openings are configured in such a manner that only compressed air exits from them. Within the scope of the invention the compressed-air openings are therefore only provided for emitting jets of compressed air without joint exit with a polymer melt. The compressed air is expediently temperature-controlled and preferably comprises warm or hot compressed air.

According to a particularly preferred embodiment of the invention, at least 70%, preferably at least 80%, more preferably at least 90%, particularly preferably at least 95% of the compressed-air openings, quite particularly preferably all the compressed-air openings are each assigned at least two respective melt openings. The assignment of a melt opening to a compressed-air opening means within the scope of the invention in particular the directly adjacent arrangement of a compressed-air opening to a melt opening without interposed other nozzle openings. The corresponding compressed air streams emerging from the compressed-air openings are therefore not only assigned a single melt opening but are (in each case) assigned at least two melt openings. It also lies within the scope of the invention that at least 70%, preferably at least 80%, more preferably at least 90%, particularly preferably at least 95% of the melt openings, quite particularly preferably all the melt openings are each assigned at least two of the compressed-air openings.

It is particularly preferred within the scope of the invention that the spacings of directly adjacent nozzle openings of the nozzle are the same or substantially the same in at least one nozzle direction on the entire nozzle. The spacing of two nozzle openings means within the scope of the invention in particular the center-point spacing of the nozzle openings. Directly adjacent nozzle openings of the nozzle means within the scope of the invention in particular nozzle openings arrayed next to one another in a nozzle direction between which no further nozzle opening is provided. The nozzle openings can, for example, be directly adjacent in the longitudinal direction of the nozzle, in the transverse direction of the nozzle or in an oblique or diagonal direction of the nozzle. The fact that the spacings of directly adjacent nozzle openings of the nozzle in a nozzle direction on the entire nozzle are the same or substantially the same means within the scope of the invention in particular that all the spacings of directly adjacent nozzle openings in the longitudinal direction of the nozzle on the entire nozzle are the same or substantially the same and/or that all the spacings of directly adjacent nozzle openings in the transverse direction of the nozzle on the entire nozzle are the same or substantially the same and/or that all the spacings of directly adjacent nozzle openings in an oblique or diagonal direction of the nozzle on the entire nozzle are the same or substantially the same.

A particularly preferred embodiment of the invention is characterized in that the spacings of directly adjacent compressed-air openings in at least one nozzle direction and/or the spacings of adjacent melt openings in at least one nozzle direction are the same or substantially the same on the entire nozzle. Adjacent melt openings means within the scope of the invention in particular two melt openings that are not directly adjacent between which however no further melt opening is provided. It is also understood that the compressed-air openings can be provided directly adjacent to one another, for example, in the longitudinal direction of the nozzle, in the transverse direction of the nozzle or in an oblique or diagonal direction of the nozzle and that the melt openings can be provided adjacent to one another, for example, in the longitudinal direction, in the transverse direction or in the oblique or diagonal direction of the nozzle. Within the scope of the invention, longitudinal direction of the nozzle means in particular the direction of the greatest longitudinal extension of the nozzle whereas transverse direction means in particular the direction transverse to, in particular perpendicular or substantially perpendicular to the longitudinal direction of the nozzle. Oblique or diagonal direction of the nozzle means within the scope of the invention in particular any direction not corresponding to the longitudinal or transverse direction of the nozzle. In a melt-blowing system in which the nozzle is above the deposition belt, the longitudinal direction of the nozzle runs preferably transversely to, in particular perpendicular or substantially perpendicular to the machine direction or to the conveying direction of the deposition belt.

It lies within the scope of the invention that the proportion of the melt openings among the total number of nozzle openings is between 10% and 50%, preferably between 12% and 45%, more preferably between 15% and 40%. According to a preferred embodiment of the invention, the nozzle has only melt opening and compressed-air openings as nozzle openings. The embodiment with the previously described proportion of melt openings among the total number of nozzle openings is based on the discovery that the condition or geometry of the resulting filament-air stream can be influenced and/or controlled in a very functionally reliable manner with this proportion of melt openings.

A particularly preferred embodiment of the invention is characterized in that at least one row or longitudinal row of nozzle openings is provided, which comprises exclusively compressed-air openings. Preferably at least two, particularly preferably at least three and quite particularly preferably at least four rows or longitudinal rows are provided that exclusively comprise compressed-air openings. Preferably one row or longitudinal row that exclusively comprises compressed-air openings is followed by one row or longitudinal row in which melt openings are provided. Expediently at least two, preferably at least three, particularly preferably at least four rows or longitudinal rows comprising melt openings are provided. The rows or longitudinal rows exclusively comprising compressed-air openings and the rows or longitudinal rows with melt openings are particularly preferably arrayed alternately in the transverse direction of the nozzle over the entire nozzle. The nozzle then comprises in particular a plurality of rows or longitudinal rows exclusively comprising compressed-air openings and a plurality of rows or longitudinal rows comprising melt openings. The fact that melt openings are present in a row or longitudinal row means in particular that the row or longitudinal row has at least one melt opening as nozzle opening. The fact that two rows or longitudinal rows follow one another means within the scope of the invention in particular that these rows or longitudinal rows follow one another directly in the transverse direction of the nozzle.

A recommended embodiment of the invention is characterized in that in the at least one row or longitudinal row having melt openings, preferably in all the rows or longitudinal rows having melt openings, both melt openings and compressed-air openings are provided and wherein the melt openings and compressed-air openings are preferably provided alternately and/or irregularly in the respective row or longitudinal row. It is therefore preferred that the nozzle has rows or longitudinal rows in which exclusively compressed-air openings are provided and that the nozzle has rows or longitudinal rows in which both melt openings and also compressed-air openings are provided. It is possible that in such a row the melt openings and the compressed-air openings are arrayed alternately in some regions or in some sections and are arrayed irregularly in some regions or in some sections.

It also lies fundamentally within the scope of the invention that all the rows or longitudinal rows of nozzle openings comprise both melt openings and also compressed-air openings and that in all the rows or longitudinal rows the melt openings and the compressed-air openings are then each arrayed preferably alternately and/or irregularly.

According to an alternative preferred embodiment of the invention, in at least one row or longitudinal row comprising melt openings, preferably in all the rows or longitudinal rows comprising melt openings, exclusively melt openings are arrayed. It is also possible within the scope of this alternative embodiment that directly adjacent melt openings are present on the nozzle, in particular in the longitudinal direction of the nozzle. Within the scope of this embodiment, it is preferred that rows or longitudinal rows comprising exclusively compressed-air openings and rows or longitudinal rows comprising exclusively melt openings are arrayed alternately in the transverse direction of the nozzle over the entire nozzle. In this connection, it is also lies within the scope of the invention that the melt openings of the rows or longitudinal rows comprising exclusively melt openings are offset in the longitudinal direction of the nozzle with respect to the compressed-air openings of the rows or longitudinal rows comprising exclusively compressed-air openings.

It is preferred that the compressed-air openings have a diameter between 0.05 and 2 mm, preferably between 0.1 and 1.5 mm, more preferably between 0.1 and 1 mm. It is recommended that all the compressed-air openings of the nozzle have the same or substantially the same diameter. Within the scope of the invention the nozzle openings of the nozzle are also configured to be round or circular.

It lies within the scope of the invention that the diameter of the melt openings deviates by a maximum of 15%, preferably by a maximum of 10% from the diameter of the compressed-air openings. It is preferable that the diameter of all the melt openings of the nozzle is the same or substantially the same. Within the scope of the invention, the diameter of the melt openings can preferably be larger or smaller than the diameter of the compressed-air openings and differs in this case by a maximum of 15%, preferably by a maximum of 10% from the diameter of the compressed-air openings. According to a particularly preferred embodiment of the invention, the diameter of the melt openings differs by a maximum of 5% from the diameter of the compressed-air openings. Expediently the diameter of the melt openings differs by 2% to 20%, preferably by 5% to 15% from the diameter of the compressed-air openings. According to one embodiment of the invention, the diameter of the melt openings substantially corresponds to the diameter of the compressed-air openings so that in particular all the nozzle openings of the nozzle have the same diameter or substantially the same diameter.

A preferred embodiment of the invention is characterized in that the nozzle has opening extensions that project beyond a nozzle face of the nozzle and the melt openings are preferably at the end thereof facing away from the nozzle face. The fact that the opening extensions project beyond a nozzle face of the nozzle assembly within the scope of the invention in particular that the opening extensions project beyond the nozzle face and that the polymer melt emerges from the opening extensions or from the melt openings at the end of the opening extensions facing away from the nozzle face. The nozzle face is in particular formed by a nozzle plate within the scope of the invention. It is preferred that the compressed-air openings are on the nozzle face or in the nozzle plate. It has proved successful that the spacing between the end of the opening extensions facing away from the nozzle face and the nozzle face is between 0.05 and 10 times, preferably between 0.1 and 5 times the diameter of the melt openings.

If the nozzle according to a preferred embodiment of the invention has opening extensions, expediently the external diameter of the opening extensions at the end thereof facing away from the nozzle face at which the melt openings are preferably provided differs by a maximum of 15%, preferably by a maximum of 10% from the diameter of the compressed-air openings. Expediently the external diameter of all the opening extensions in this region is the same or substantially the same. Within the scope of the invention, the external diameter of the opening extensions at the end thereof facing away from the nozzle face can be greater than or smaller than the diameter of the compressed-air openings. According to a preferred embodiment, the external diameter of the opening extensions in this region differs by a maximum of 5% from the diameter of the compressed-air openings. Expediently the external diameter of the opening extensions at the end facing away from the nozzle face differs by between 2% and 20%, preferably between 5% and 15% from the diameter of the compressed-air openings. According to a further preferred embodiment of the invention, the external diameter of the opening extensions at the end facing away from the nozzle face corresponds to the diameter of the compressed-air openings or substantially corresponds to this diameter.

In order to attain the inventive object, the invention further teaches an apparatus for making melt-blown nonwoven fabrics, in particular from a polymer melt of thermoplastic material, comprising at least one nozzle that delivers filaments, in particular a previously described nozzle, and a continuously movable deposition belt extends below the nozzle, on which the filaments can be deposited to form the melt-blown nonwoven fabric, and the nozzle is configured as a melt-blowing blow head and comprises a plurality of nozzle openings—preferably extending in at least two, more preferably in at least three, particularly preferably in at least four rows or longitudinal rows extending transversely, in particular perpendicular to or substantially perpendicular to the conveying direction of the deposition belt, and a part of the nozzle openings is configured as melt openings and a part or the other part of the nozzle openings is configured as compressed-air openings, and the melt openings and the compressed-air openings are spaced apart from one another in a regular pattern and/or irregularly.

It is preferred that the deposition belt is a foraminous belt and in particular a continuously movable depositing foraminous belt. It is further preferred that a suction device, in particular a suction fan, is below the deposition belt or depositing foraminous belt, in particular below a deposition region of the filaments, by means of which air or process air can be sucked from below through the depositing foraminous belt. It lies further within the scope of the invention that the apparatus comprises at least two nozzles or melt-blowing blow heads delivering filaments. In this connection, it is preferred that the two resulting filament-air streams are combined in a contact zone on the flow path between the nozzle and the deposition belt or depositing foraminous belt. It is also preferred that short fibers, for example, pulp short fibers are added to the filament-air stream or the filament-air streams and specifically in particular in the previously described contact zone. For this purpose the apparatus preferably comprises a device that delivers short fibers or pulp short fibers. The term pulp means within the scope of the invention in particular a fibrous material based on wood pulp or cellulose.

It is possible that the nozzle or the melt-blowing blow head, in particular the nozzles or the melt-blowing blow heads extend obliquely or at an angle to the depositing foraminous belt so that the resulting filament-air streams preferably flow obliquely or at an angle in the direction of the deposition belt or the surface thereof and/or in the direction of a short-fiber air stream or pulp-short fiber air stream before the streams are preferably combined in the contact zone and then flow particularly preferably as a combined stream with a flow direction perpendicular or substantially perpendicular to the foraminous belt surface of the depositing foraminous belt.

In order to further attain the inventive object the invention further teaches a method of making a melt-blown nonwoven fabric using a previously described apparatus, and filaments, in particular of a polymer melt of thermoplastic material are produced using the at least one nozzle and wherein the filaments are deposited on a continuously movable deposition belt to form the melt-blown nonwoven fabric. Within the scope of the method according to the invention, it is preferred that short fibers, in particular pulp short fibers, are added to the filaments on the flow path between the at least one nozzle and the deposition belt, preferably added in a contact zone so that a filament-short fiber mixture is deposited on the deposition belt as melt-blown nonwoven fabric.

The invention also relates to the use of a previously described nozzle in a method of making a nonwoven fabric or melt-blown nonwoven fabric from filaments or melt-blowing filaments and pulp short fibers.

The invention is based on the discovery that with the nozzle according to the invention, the condition or geometry of the filament-air stream produced can be functionally reliably and specifically influenced. As a result of the decoupling of compressed-air openings and melt openings in which a direct assignment of respectively one compressed-air opening to merely one single melt opening is avoided, the resulting condition or geometry of the filament-air stream can be influenced to a sufficient extent in order to avoid perturbing influences in the flow of the filament-air stream or counteract this. The as it were free distribution of the compressed-air openings and the melt openings on the nozzle allow an arrangement of the nozzle openings or the melt openings and the compressed-air openings that is tailored for the respective application. The resulting filament-air stream can also be influenced functionally reliably via the ratio of melt openings to compressed-air openings. With the nozzle according to the invention, it is possible to provide an apparatus for making melt-blown nonwoven fabrics in which perturbing influences for the filament-air stream on the flow path between the nozzle and a deposition belt, for example, turbulence in the edge regions of the filament-air stream can be avoided. This is particularly advantageous when combining several filament-air streams or combining one or more filament air streams with short fibers, in particular pulp short fibers. It should furthermore be stressed that the measures according to the invention are not very complex and in particular not very expensive so that the nozzle according to the invention is characterized by a high economic viability. Finally it should be noted that the nozzle according to the invention is very variable since it allows the nozzle to reconfigure a melt opening into a compressed-air opening and conversely with not very complex measures.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
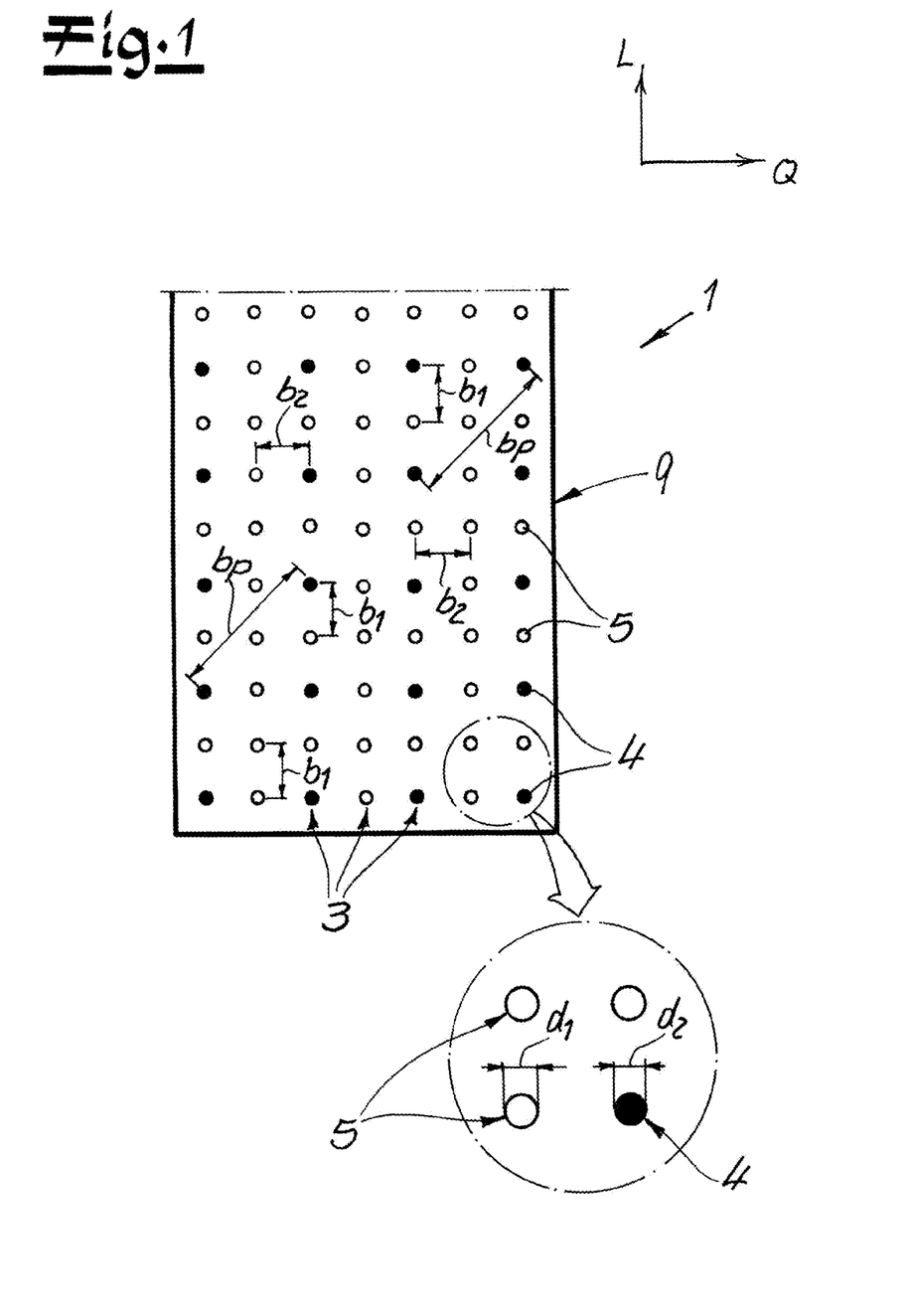
FIG. 1 is a bottom view of a first embodiment of the invention.
Figure 2:
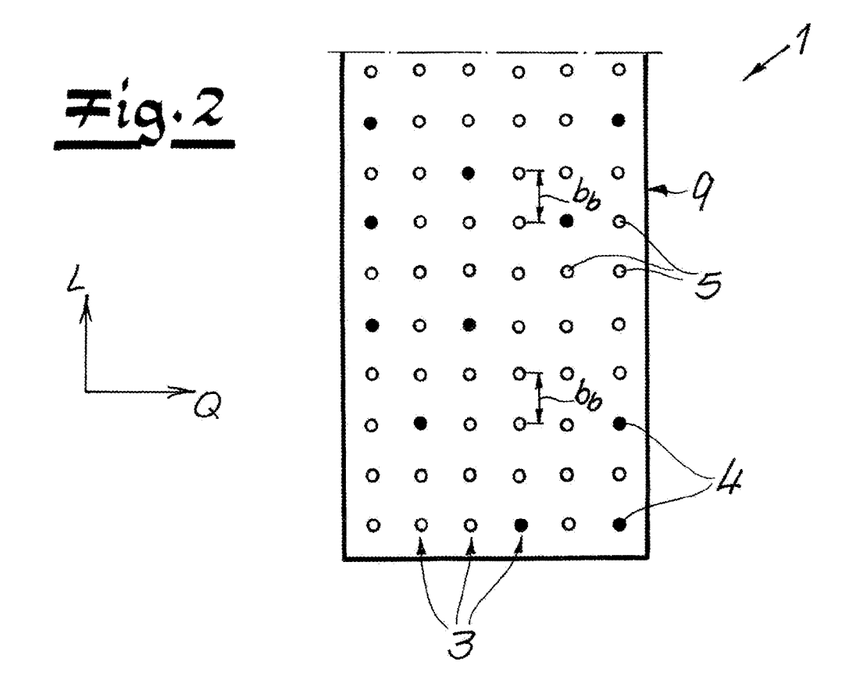
FIG. 2 is a bottom view of a second embodiment.
Figure 3:
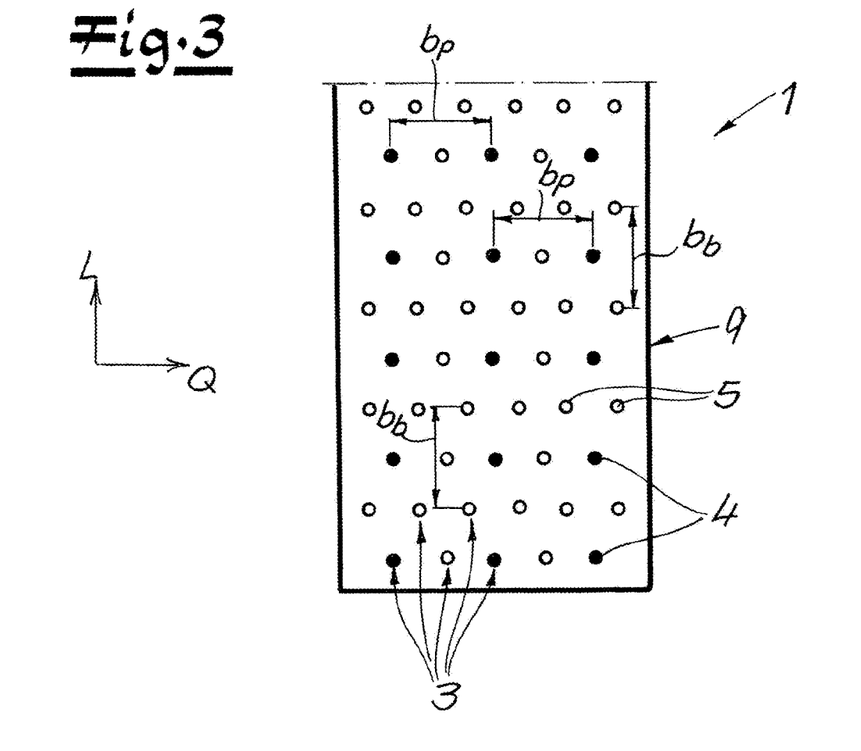
FIG. 3 is a bottom view of a third embodiment.

FIGS. 1 to 3 show preferred embodiments of nozzles 1 according to the invention for making filaments 2, in particular from a polymer melt of thermoplastic material. The nozzle 1 is configured as a rectangular body or plate 9 forming a melt-blowing blow head that has a plurality of nozzle openings that are arrayed in several longitudinal rows 3. Some the nozzle openings are melt openings 4 that are shown in FIGS. 1 to 3 as filled circles. The rest of the nozzle openings are compressed-air openings 5 that are shown as unfilled circles in FIGS. 1 to 3.

In the preferred embodiments of the nozzle 1 according to FIGS. 1 and 3 the melt openings 4 and the compressed-air openings 5 are spaced from one another in a regular pattern. In the preferred embodiment of the nozzle 1 according to FIG. 2 the melt openings 4 and the compressed-air openings 5 are irregularly spaced apart or arrayed from one another. The openings 4 and 5 of the nozzle 1 are provided or distributed within the scope of the invention and in the embodiment in or on the nozzle plate 9. Preferably and in the embodiment according to the drawing, the nozzle 1 has only melt openings 4 and compressed-air openings 5 as nozzle openings.

In the preferred embodiment of the nozzle 1 according to FIG. 1 the nozzle openings or the melt openings 4 and the compressed-air openings 5 are arrayed in seven longitudinal rows 3 on the nozzle 1 or the nozzle plate 9. In the embodiment according to FIG. 2, the melt openings 4 and the compressed-air openings 5 are arrayed in six longitudinal rows 3 on the nozzle 1 or the nozzle plate 9. In the preferred embodiment of the nozzle 1 according to FIG. 3, the melt openings 4 and the compressed-air openings 5 are arrayed or distributed in eleven longitudinal rows 3 on the nozzle 1 or the nozzle plate 9.

The term longitudinal row 3 means within the scope of the invention a row of nozzle openings that extend in the longitudinal direction L of the nozzle 1 and in this respect have a greater extension and/or a greater number of nozzle openings than transverse rows of the nozzle 1 extending in the transverse direction Q of the nozzle 1 that result from a plurality of adjacently extending longitudinal rows 3. The transverse direction Q of the nozzle 1 thus extends expediently and in the embodiment transversely to, in particular perpendicular to or substantially perpendicular to the longitudinal direction L of the nozzle 1.

The nozzle 1 of this invention forms the outlet of a supplier 11 of air for the compressed-air nozzles 5 and melted plastic to the melt nozzles 4. In particular, continuous filaments can be produced using the nozzle 1 according to the invention. The filaments 2 or continuous filaments produced are preferably produced from a polymer melt of thermoplastic material, and the thermoplastic material is particularly preferably polypropylene.

Expediently and in the embodiment according to the figures, the melt openings 4 are configured in such a manner that only the polymer melt coming from the supply 11 exits therefrom. Particularly preferably and in the embodiment, the melt openings 4 are configured in such a manner that the polymer melt exits therefrom without any compressed air emerging coaxially through the respective melt opening 4. Furthermore, preferably and in the embodiment, the respective melt openings 4 are assigned not just a single compressed-air opening 5 or not just a single compressed air stream. Within the scope of the invention and in the embodiment, the compressed-air openings 5 are additionally configured in such a manner that only compressed air from the supply 11 exits therefrom.

According to a preferred embodiment of the invention and in the embodiment according to FIGS. 1 and 3, at least 80% of the compressed-air openings 5, preferably all the compressed-air openings 5 are each assigned at least two melt openings 4. The assignment of one melt opening 4 to one compressed-air opening 5 means within the scope of the invention in particular the directly adjacent arrangement of a melt opening 4 to a compressed-air opening 5 without interposed other nozzle openings. A direct adjacency of two nozzle openings 4 can exist within the scope of the invention in the longitudinal direction L of the nozzle 1, in the transverse direction Q of the nozzle 1 or in a diagonal or oblique direction of the nozzle 1.

It lies further within the scope of the invention that at least 85% of the melt openings 4 are each assigned at least two compressed-air openings 5. It is recommended and in the embodiment according to FIGS. 1 to 3 all the melt openings 4 are each assigned at least two compressed-air openings 5.

According to a preferred embodiment of the invention and in the embodiment according to the figures, the proportion of the melt openings 4 among the total number of nozzle openings is between 10% and 50%, preferably between 12% and 45%. In the preferred embodiments of the nozzle 1 according to FIGS. 1 and 3, the proportion of the melt openings 4 among the total number of nozzle openings may be about 30%. In the preferred embodiment of the nozzle 1 according to FIG. 2, the proportion of the melt openings 4 among the total number of nozzle openings may be about 20%.

Within the scope of the invention, it is particularly preferred that the spacings of directly adjacent nozzle openings of the nozzle 1 in at least one nozzle direction on the entire nozzle 1 are the same or substantially the same. Spacing of two nozzle openings means within the scope of the invention and in the embodiment in particular the center-point spacing of the nozzle openings. The nozzle openings can be directly adjacent in the longitudinal direction L of the nozzle 1, in the transverse direction Q of the nozzle 1 or in an oblique direction or diagonal direction of the nozzle 1. The direct adjacency of two nozzle openings means in particular that no further nozzle opening is provided between the two nozzle openings.

In the preferred embodiment of the nozzle 1 according to FIG. 1, approximately all the spacings $b_1$ of directly adjacent nozzle openings of the nozzle 1 on the entire nozzle 1 in the longitudinal direction L of the nozzle 1 are the same or substantially the same. Furthermore, preferably and in the embodiment of the nozzle 1 according to FIG. 1, all the spacings $b_2$ of directly adjacent nozzle openings of the nozzle 1 in the transverse direction Q of the nozzle 1 on the entire nozzle 1 are the same or substantially the same. It is recommended that and in the preferred embodiment according to FIG. 1, all the spacings $b_1$ and $b_2$ are the same or substantially the same.

It is further preferred that the spacings $b_b$ of directly adjacent compressed-air openings 5 in at least one nozzle direction on the entire nozzle 1 are the same or substantially the same. In FIGS. 2 and 3, for example, it can be identified that all the spacings $b_b$ of directly adjacent compressed-air openings 5 in the longitudinal direction L of the nozzle 1 on the entire nozzle 1 are the same or substantially the same.

It is recommended that and in the preferred embodiment according to FIGS. 1 and 3, the spacings $b_p$ of adjacent melt openings 4 in at least one nozzle direction on the entire nozzle 1 are the same or substantially the same. Adjacent melt openings 4 means two melt openings 4 that are not directly adjacent between which however no further melt opening 4 is provided. In the embodiment according to FIG. 3, approximately all the spacings $b_p$ of adjacent melt openings 4 in the transverse direction Q of the nozzle 1 on the entire nozzle 1 are the same or substantially the same. In the embodiment according to FIG. 1, approximately all the spacings $b_p$ of adjacent melt openings 4 in a diagonal or oblique direction of the nozzle on the entire nozzle 1 are the same or substantially the same. Here the spacings $b_1$, $b_2$, $b_p$, and $b_b$ are the same According to a preferred embodiment of the nozzle 1 according to the invention and in the embodiment according to FIGS. 1 and 3, at least one longitudinal row 3 of nozzle openings is provided that exclusively comprises compressed-air openings 5. In the embodiment according to FIG. 1 there are three longitudinal rows 3 and in the embodiment according to FIG. 3 there are six longitudinal rows 3 that exclusively comprise compressed-air openings 5. Expediently in the transverse direction of the nozzle 1 one longitudinal row 3 that exclusively comprises compressed-air openings 5 is followed by one longitudinal row 3 in which melt openings 4 are provided (FIGS. 1 and 3). Preferably and in the embodiment according to FIGS. 1 and 3 the longitudinal rows 3 comprising exclusively compressed-air openings 5 and the longitudinal rows 3 with melt openings 4 alternate in the transverse direction Q of the nozzle 1 over the entire nozzle 1.

According to a preferred embodiment of the invention, in the at least one longitudinal row 3 having the melt openings 4, preferably and in the embodiment according to FIG. 1 in all the longitudinal rows 3 having melt openings 4, both melt openings 4 and also compressed-air openings 5 are provided. Expediently and in the embodiment according to FIG. 1, the melt openings 4 and the compressed-air openings 5 alternate in the longitudinal rows 3 that have melt openings 4 and compressed-air openings 5.

According to an alternative embodiment of the invention in the at least one longitudinal row 3 having melt openings 4, preferably in all the longitudinal rows 3 having melt openings 4, exclusively melt openings 4 are provided. This is the case in the preferred embodiment of the nozzle 1 according to FIG. 3. In the preferred embodiment according to FIG. 3, the melt openings 4 of the longitudinal rows 3 comprising exclusively melt openings 4, are additionally offset in the longitudinal direction L of the nozzle 1 with respect to the compressed-air openings 5 of the longitudinal rows 3 comprising exclusively compressed-air openings 3. Within the scope of the embodiment according to FIG. 3, directly adjacent melt openings 4 are then present in particular in the longitudinal direction L of the nozzle 1.

A further preferred embodiment of the invention is characterized in that all the longitudinal rows 3 of nozzle openings comprise both melt openings 4 and also compressed-air openings 5. This is the case in the preferred embodiment of the nozzle 1 according to FIG. 2. In the preferred embodiment according to FIG. 2, the melt openings 4 and the compressed-air openings 5 are additionally arrayed irregularly in all the longitudinal rows 3.

Expediently and in the embodiment, the compressed-air openings 5 have a diameter $d_1$ between 0.1 and 1.5 mm. In the embodiment according to the figures, the compressed-air openings 5 may have a diameter $d_1$ of about 1 mm (FIG. 1). According to a preferred embodiment and in the embodiment, the diameter $d_2$ of the melt openings 4 differs by a maximum of 10% from the diameter $d_1$ of the compressed-air openings 5. In the embodiment (FIG. 1) the diameter $d_2$ of the melt openings 4 is about 10% smaller than the diameter $d_1$ of the compressed-air openings 5.

Figure 4:
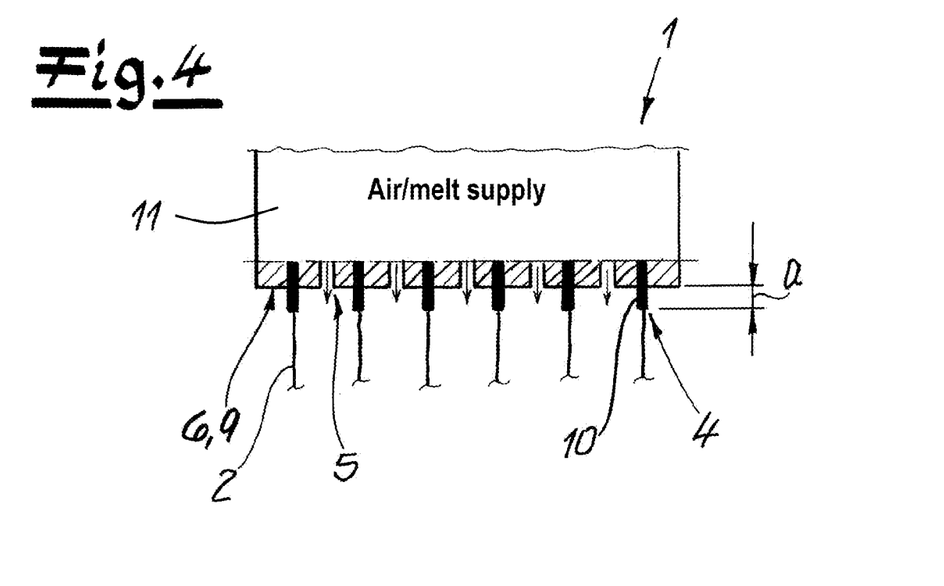
FIG. 4 is a largely schematic large-scale cross section through the nozzle.

A particularly preferred embodiment of the nozzle 1 according to the invention is characterized in that the nozzle 1 has tubular extensions 10 that project beyond a nozzle face 6 of the nozzle 1 and preferably and in the embodiment, the melt openings 4 are provided at the end thereof facing away from the nozzle face 6 (FIG. 4). This means within the scope of the invention in particular that the opening extensions 10 extend from the respective melt openings 4 beyond the nozzle face 6 and that the polymer melt emerges from the opening extensions 10 or from the melt openings 4 at the lower end of the opening extensions 10 facing away from the nozzle face 6. Expediently and in the embodiment, the nozzle face 6 of the nozzle is formed by the nozzle plate 9 of the nozzle 1. Further preferably and in the embodiment, the compressed-air openings 5 are provided in the nozzle plate 9 or in the nozzle face 6. It has proved successful that the spacing a between the end of the opening extensions 10 facing away from the nozzle face 6 and the nozzle face 6 corresponds to between $0.05 \times d_2$ and $10 \times d_2$, preferably corresponds to between $0.1 \times d_2$ and $5 \times d_2$, $d_2$ being the diameter of the melt openings 4. In the preferred embodiment according to FIG. 4, the spacing a between the lower ends of the opening extensions 10 and the nozzle face 6 may approximately correspond to $2 \times d_2$. The external diameter of the opening extensions 10 at the end facing away from the nozzle face 6 of the nozzle 1 preferably differs by a maximum of 15%, preferably by a maximum of 10% and particularly preferably by a maximum of 5% from the diameter $d_1$ of the compressed-air openings 5. Expediently the external diameter of the opening extensions 10 at the end facing away from the nozzle face 6 of the nozzle 1 corresponds to the diameter $d_1$ of the compressed-air openings 5 or substantially corresponds to this diameter.

Figure 5:
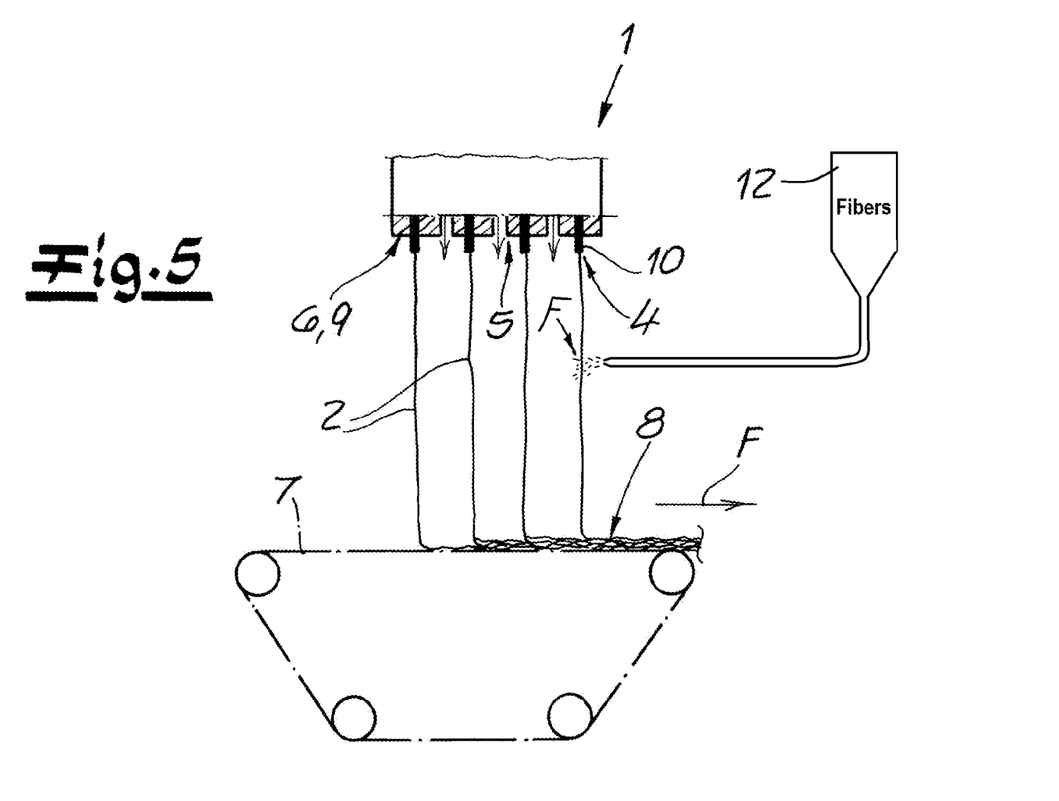
FIG. 5 is a small-scale diagrammatic view of the apparatus of this invention.

FIG. 5 shows an apparatus according to the invention for making melt-blown nonwoven fabric 8 with at least one nozzle 1 delivering filaments 2. Located underneath the nozzle 1 is a continuously movable deposition belt 7, preferably and in the embodiment a endless and continuously circulating foraminous belt on which the filaments 2 can be deposited to form the melt-blown nonwoven fabric 8. The nozzle 1 is configured as a melt-blowing blow head and has a plurality of nozzle openings provided in a plurality of longitudinal rows 3 extending transversely, in particular perpendicularly or substantially perpendicularly to the conveying direction F of the depositing foraminous belt 7. The nozzle 1 expediently and in the embodiment according to FIG. 5 comprises a previously described nozzle 1 according to the invention. A fiber supply 12 is providing for injecting short fibers F into the space below the nozzle plate 9 and above the belt 7 to mix with the descending filaments 2 such that, if desired, a mixture of monofilaments 2 and fibers F is deposited on the belt.

We claim:

1. An apparatus for making filaments, the apparatus comprising:
   a nozzle having
      a face extending in a longitudinal direction and transversely thereto in a transverse direction and
      an array of melt openings and compressed-air openings on the face in a plurality of longitudinally extending rows and a plurality of transversely extending rows, between 12% and 45% of the melt and compressed-air openings being melt openings and the balance being compressed-air openings; and
   means for supplying a polymer melt to the melt openings to extrude the polymer melt downstream from the melt openings as polymer filaments and for supplying compressed air to the compressed-air openings to form air jets issuing downstream from the compressed-air openings between the polymer filaments.

2. The apparatus according to claim 1, wherein the means supplies only the polymer melt and no air to the melt openings such that only the polymer melt issues from the melt openings.

3. The apparatus according to claim 2, wherein the means supplies only compressed air and no polymer melt to the compressed-air openings such that only the compressed air issues from the compressed-air openings.

4. The apparatus according to claim 1, wherein at least 70% of the compressed-air openings are flanked by two of the melt openings.

5. The apparatus according to claim 1, wherein a spacing between adjacent openings is generally the same for all of the openings.

6. The apparatus according to claim 1, wherein all of the openings of alternate longitudinal rows are compressed-air openings and at least some of the openings of the longitudinal rows between the longitudinal rows wholly of compressed-air openings are melt openings.

7. The apparatus according to claim 6, wherein the melt openings in each of the longitudinal rows between the longitudinal rows wholly of compressed-air openings are separated longitudinally from one another by compressed-air openings.

8. The apparatus according to claim 1, wherein the compressed-air openings each have a diameter between 0.05 and 2 mm.

9. The apparatus according to claim 1, wherein diameters of the melt openings deviate by a maximum of 15% from diameters of the compressed-air openings.

10. The apparatus according to claim 1, further comprising:
    respective tubular extensions extending downstream from the face of the nozzle from the melt openings such that the filaments from the melt openings drop from the extensions away from the face, the extensions each having a lower end at a vertical spacing from the face equal to between 0.1 and 5 times a diameter of the respective melt opening.

11. The apparatus according to claim 1, further comprising:
    a deposition belt spaced below the face for receiving the filaments and traveling in a transport direction at least generally parallel to the transverse direction for conveying away a nonwoven web formed by the filaments deposited on the belt.

12. The apparatus according to claim 11, further comprising:
    means for injecting short fibers into a space between the nozzle and the belt such that a mixture of the filaments and the fibers is formed on the belt.

13. A method of making a nonwoven, the method comprising the steps of:
    providing a nozzle having a face extending in a horizontal and longitudinal direction and transversely thereto in a transverse and horizontal direction and provided with an array of downwardly directed melt openings and downwardly directed compressed-air openings in a plurality of longitudinally extending rows and a plurality of transversely extending rows, between 12% and 45% of the melt and compressed-air openings being melt openings and the balance being compressed-air openings;
    supplying a polymer melt to the nozzle openings to extrude the polymer melt downstream from the melt openings as polymer filaments;
    supplying compressed air to the compressed-air openings to form air jets issuing downstream from the compressed-air openings between the polymer filaments; and
    depositing the filaments on a moving belt beneath the nozzle as the nonwoven.

14. The method according to claim 13, further comprising the step of:
    injecting short fibers into a space between the nozzle and the belt such that a mixture of the filaments and the fibers is formed on the belt.

15. An apparatus for making filaments, the apparatus comprising:
    a nozzle having a face extending in a longitudinal direction and transversely thereto in a transverse direction, the nozzle having melt openings and compressed-air openings on the face in a plurality of longitudinally extending rows and a plurality of transversely extending rows, all of the openings of alternate longitudinal rows being compressed-air openings and at least some of the openings of the longitudinal rows between the longitudinal rows wholly of compressed-air openings being melt openings, the melt openings in each of the longitudinal rows between the longitudinal rows wholly of compressed-air openings being separated longitudinally from one another by compressed-air openings; and means for supplying a polymer melt to the nozzle openings to extrude the polymer melt downstream from the melt openings as polymer filaments and for supplying compressed air to the compressed-air openings to form air jets issuing downstream from the compressed-air openings between the polymer filaments.

* * * * *